US008560169B2

(12) United States Patent  (10) Patent No.: US 8,560,169 B2
Sasajima et al.  (45) Date of Patent: Oct. 15, 2013

(54) VEHICULAR PARKING FEASIBILITY DETERMINING SYSTEM, VEHICULAR PARKING SPACE DETECTION SYSTEM AND VEHICULAR MOVABLE RANGE DETECTION SYSTEM

(75) Inventors: Takeshi Sasajima, Wako (JP); Yoshimitsu Aiga, Wako (JP); Takashi Asaba, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 428 days.

(21) Appl. No.: 12/745,864
(22) PCT Filed: Dec. 12, 2008
(86) PCT No.: PCT/JP2008/072652
§ 371 (c)(1),
(2), (4) Date: Jun. 2, 2010
(87) PCT Pub. No.: WO2009/078356
PCT Pub. Date: Jun. 25, 2009

(65) Prior Publication Data
US 2010/0274446 A1 Oct. 28, 2010

(30) Foreign Application Priority Data

Dec. 18, 2007  (JP) .................................. 2007-326396
Dec. 27, 2007  (JP) .................................. 2007-336591
Dec. 27, 2007  (JP) .................................. 2007-336592

(51) Int. Cl.
B60R 21/00 (2006.01)
(52) U.S. Cl.
USPC ........................................ 701/36; 340/932.2
(58) Field of Classification Search
USPC .................... 701/36, 41, 300, 31.4, 117, 118;
340/932.2, 435–437, 903, 904, 425.5;
180/167, 199, 204; 367/97, 118, 127,
367/129; 342/70, 43
See application file for complete search history.

(56) References Cited

U.S. PATENT DOCUMENTS

| 4,931,930 | A * | 6/1990 | Shyu et al. .................... 701/36 |
| 6,170,591 | B1 * | 1/2001 | Sakai et al. .................... 180/204 |
| 6,819,284 | B2 * | 11/2004 | Maier et al. .................... 342/70 |
| 6,898,527 | B2 * | 5/2005 | Kimura et al. .................... 701/301 |
| 6,970,101 | B1 * | 11/2005 | Squire et al. .................... 340/932.2 |
| 7,024,286 | B2 | 4/2006 | Kimura et al. |
| 7,295,227 | B1 * | 11/2007 | Asahi et al. .................... 348/118 |
| 7,653,487 | B2 * | 1/2010 | Okuda .................... 701/301 |
| 7,739,046 | B2 * | 6/2010 | Satonaka et al. .................... 701/300 |
| 2004/0204807 | A1 * | 10/2004 | Kimura et al. .................... 701/36 |
| 2005/0122234 | A1 * | 6/2005 | Danz et al. .................... 340/932.2 |
| 2005/0285758 | A1 | 12/2005 | Matsukawa et al. |
| 2006/0250278 | A1 * | 11/2006 | Tillotson et al. ........... 340/932.2 |
| 2008/0211651 | A1 * | 9/2008 | Beutnagel-Buchner et al. .......... 340/459 |

FOREIGN PATENT DOCUMENTS

| GB | 2 409 921 A | 7/2005 |
| JP | 5-296777 A | 11/1993 |
| JP | 9-180100 A | 7/1997 |
| JP | 2002-154396 A | 5/2002 |
| JP | 2002-243857 A | 8/2002 |
| JP | 2003-48500 A | 2/2003 |
| JP | 2004-314708 A | 11/2004 |
| JP | 2006-312439 | 11/2006 |
| JP | 2007272276 | * 10/2007 |

* cited by examiner

*Primary Examiner* — Marthe Marc-Coleman
(74) *Attorney, Agent, or Firm* — Carrier Blackman & Associates, P.C.; Joseph P. Carrier; Jeffrey T. Gedeon

(57) ABSTRACT

A radar device (11) transmits electromagnetic waves so as to scan a predetermined angular range in the horizontal direction around a subject vehicle at predetermined time intervals, and when reflected waves of the electromagnetic waves reflected from an object are received, a reflection point where the electromagnetic waves are reflected from the object is detected based on the result of receiving the reflected waves, the existence of a parking space is determined based on pre-stored subject vehicle body dimensional data and a sequence of reflection points and, furthermore, the feasibility of parking in the parking space (Sp) is determined In this process, since the feasibility of parking is determined based on a road width (Wx) and a width (Wy) of the parking space (Sp) calculated based on the sequence of reflection points, it is possible to carry out a determination of the feasibility of parking in the parking space (Sp) with better precision.

24 Claims, 13 Drawing Sheets

VEHICULAR PARKING FEASIBILITY DETERMINING SYSTEM, VEHICULAR PARKING SPACE DETECTION SYSTEM AND VEHICULAR MOVABLE RANGE DETECTION SYSTEM

TECHNICAL FIELD

The present invention relates to a vehicular parking feasibility determining system for accurately determining the existence of a parking space that can be parked in, a vehicular space detection system for accurately determining the existence of a parking space that can be parked in from a position just before it, and a vehicular movable range detection system for accurately determining the existence of a subject vehicle movable range for parking in a parking space.

BACKGROUND ART

An arrangement in which, when a subject vehicle is passing a parking space, the relative distance from the subject vehicle to surrounding objects is detected by means of a distance sensor formed from a laser radar or a photosensor, the position of the subject vehicle is detected by means of a steering angle sensor and a vehicle speed sensor, prestored subject vehicle external dimensions or minimum turning radius-related information is compared with the detection results from the above sensors to thus determine whether or not there is a space that can be parked in or the parking space can be parked in when moving with the minimum turning radius, and the driver is informed of this by voice is known from Patent Document 1 below.

In the same way as in Patent Document 1 above, an arrangement in which, when a subject vehicle is passing a parking space, the existence of a parking space is determined by detecting the state of obstacles is known from Patent Documents 2 and 3 below.

[Patent Document 1] Japanese Patent Application Laid-open No. 9-180100
[Patent Document 2] Japanese Patent Application Laid-open No. 2002-154396
[Patent Document 3] Japanese Patent Application Laid-open No. 2002-243857

DISCLOSURE OF INVENTION

Problems to be Solved by the Invention

When a subject vehicle is reversed and parked in a parking space that is perpendicular to a road, even if the parking space is sufficiently wide, parking is sometimes impossible when the width of the road that the parking space faces is narrow, or parking can sometimes become possible by maneuvering back-and-forth a plurality of times. In this way, the feasibility of parking in a parking space is restricted by not only the width of the parking space but also the width of the road that the parking space faces.

However, in the above-mentioned conventional arrangements, the feasibility of parking is determined based on the width of a parking space, and there is the problem that since the width of the road is not taken into consideration, it cannot determine a case in which parking is actually impossible due to the width of the road being narrow although the width of the parking space is sufficient, and a case in which parking becomes possible by maneuvering back-and-forth.

Furthermore, in the above-mentioned conventional arrangements, since determination of whether or not a parking space can be parked in cannot be carried out unless the subject vehicle has once passed the parking space in mind, there is the problem that the ease of use is poor.

The present invention has been accomplished in light of the above-mentioned circumstances, and it is a first object thereof to provide a vehicular parking feasibility determining system that enables the existence of a parking space that can be parked in to be accurately determined.

Furthermore, it is a second object of the present invention to provide a vehicular space detection system that enables the existence of a parking space that can be parked in to be accurately determined from a position just before it.

Moreover, it is a third object of the present invention to provide a vehicular movable range detection system that enables the existence of a subject vehicle movable range for parking in a parking space to be accurately determined.

Means for Solving the Problems

In order to attain the above first object, according to a first aspect of the present invention, there is provided a vehicular parking feasibility determining system comprising transceiving means that transmits electromagnetic waves so as to scan a predetermined angular range in the horizontal direction around a subject vehicle at predetermined time intervals, and receives reflected waves of the electromagnetic waves reflected from an object, reflection point detection means that detects a reflection point at which electromagnetic waves are reflected from the object based on the result of reception of reflected waves by the transceiving means, parking space existence determining means that determines the existence of a parking space based on pre-stored subject vehicle body dimensional data and a sequence of the reflection points, and parking feasibility determining means that determines the feasibility of parking the subject vehicle from a current position thereof to the parking space, characterized in that the system comprises movable range calculation means that calculates a movable range in the subject vehicle width direction based on the sequence of reflection points, and parking space width calculation means that calculates a width of the parking space in subject vehicle length direction based on the sequence of reflection points, the parking feasibility determining means determining the feasibility of parking based on the movable range and the width of the parking space.

According to a second aspect of the present invention, in addition to the first aspect, the system comprises processing region setting means that sets a predetermined processing region formed from a first range in the subject vehicle width direction and a second range in subject vehicle length direction, the parking space existence determining means determining that the parking space exists when, among reflection points present within the processing region, a distance in the vehicle length direction between a pair of reflection points of the electromagnetic waves with adjacent angles in the horizontal direction is a predetermined value or greater.

According to a third aspect of the present invention, in addition to the second aspect, the system comprises boundary line calculation means that calculates as a vehicle width direction boundary line a straight line for which the sum of the distances in the vehicle width direction to the reflection points present within the processing region is a minimum, and calculates as a vehicle length direction boundary line a straight line for which the sum of the distances in subject vehicle length direction therefrom is a minimum, the movable range calculation means setting the processing region on left and right with the subject vehicle body axis as the center, and calculating as a movable range the minimum distance among the distances in the vehicle width direction of the left and right vehicle width direction boundary lines.

According to a fourth aspect of the present invention, in addition to the third aspect, the system comprises reflection point storage means that, when the pair of reflection points is present within the processing region, stores as a first reflection point a reflection point for which, of the pair of reflection points, the distance from the subject vehicle in the vehicle length direction is near, and stores as a second reflection point a reflection point for which the distance is far, the boundary line calculation means calculating, relative to the first reflection point stored in one of left and right processing regions, the vehicle width direction boundary line within the other processing region that is more distant in the vehicle length direction.

According to a fifth aspect of the present invention, in addition to the third or fourth aspect, when a reflection point is present on the subject vehicle body axis side relative to the vehicle width direction boundary line within the left and right processing regions, the boundary line calculation means corrects the vehicle width direction boundary line so as to pass through the reflection point.

According to a sixth aspect of the present invention, in addition to any one of the third to fifth aspects, the system comprises reflection point storage means that, when the pair of reflection points is present within the processing region, stores as a first reflection point a reflection point for which, of the pair of reflection points, the distance from the subject vehicle in the vehicle length direction is near, and stores as a second reflection point a reflection point for which it is far, and intersection point calculation means that calculates an intersection point of the vehicle width direction boundary line on the parking space side with the vehicle length direction boundary line calculated based on the second reflection point, the parking space width calculation means calculating a distance in the vehicle length direction between the first reflection point and the intersection point as the width of the parking space.

According to a seventh aspect of the present invention, in addition to the sixth aspect, the parking space existence determining means determines that the parking space exists when the distance in the vehicle width direction between the second reflection point and the intersection point is a predetermined value or greater.

In order to attain the above second object, according to an eighth aspect of the present invention, there is provided a vehicular parking space detection system comprising transceiving means that transmits electromagnetic waves so as to scan a predetermined angular range in the horizontal direction around a subject vehicle at predetermined time intervals, and receives reflected waves of the electromagnetic waves reflected from an object, reflection point detection means that detects a reflection point at which electromagnetic waves are reflected from the object based on the result of reception of reflected waves by the transceiving means, and parking space existence determining means that determines the existence of a parking space based on pre-stored subject vehicle body dimensional data and a sequence of the reflection points, characterized in that the system comprises processing region setting means that sets a predetermined processing region formed from a first range in the subject vehicle width direction and a second range in subject vehicle length direction, the parking space existence determining means determining that the parking space exists when, among reflection points present within the processing region, a distance in the vehicle length direction between the pair of reflection points of the electromagnetic waves with adjacent angles in the horizontal direction is a predetermined value or greater.

According to a ninth aspect of the present invention, in addition to the eighth aspect, the system comprises boundary line calculation means that calculates as a vehicle width direction boundary line a straight line for which the sum of the distances in the subject vehicle width direction to the reflection points present within the processing region is a minimum, and calculates as a vehicle length direction boundary line a straight line for which the sum of the distances in subject vehicle length direction therefrom is a minimum, reflection point storage means that, when the pair of reflection points is present within the processing region, stores as a first reflection point a reflection point for which, of the pair of reflection points, the distance from the subject vehicle in the vehicle length direction is near, and stores as a second reflection point a reflection point for which the distance is far, and intersection point calculation means that calculates an intersection point of the vehicle width direction boundary line on the parking space side with the vehicle length direction boundary line calculated based on the second reflection point, the parking space existence determining means determines that the parking space exists when the distance in the vehicle width direction between the second reflection point and the intersection point is a predetermined value or greater.

In order to attain the above third object, according to a tenth aspect, there is provided a vehicular movable range detection system comprising: transceiving means that transmits electromagnetic waves so as to scan a predetermined angular range in the horizontal direction around a subject vehicle at predetermined time intervals, and receives reflected waves of the electromagnetic waves reflected from an object, reflection point detection means that detects a reflection point at which electromagnetic waves are reflected from the object based on the result of reception of reflected waves by the transceiving means, and movable range calculation means that calculates a movable range in the subject vehicle width direction based on the sequence of reflection points, characterized in that the system comprises processing region setting means that sets a predetermined processing region formed from a first range in the subject vehicle width direction and a second range in subject vehicle length direction, and boundary line calculation means that calculates as a vehicle width direction boundary line a straight line for which the sum of the distances in the subject vehicle width direction to the reflection points present within the processing region is a minimum, and calculates as a vehicle length direction boundary line a straight line for which the sum of the distances in subject vehicle length direction therefrom is a minimum, the movable range calculation means setting the processing region on left and right with the subject vehicle body axis as the center, and calculating as a movable range the minimum distance among the distances in the vehicle width direction of the left and right vehicle width direction boundary lines.

According to an eleventh aspect of the present invention, in addition to the tenth aspect, the system comprises reflection point storage means that, when the pair of reflection points is present within the processing region, stores as a first reflection point a reflection point for which, of the pair of reflection points, the distance from the subject vehicle in the vehicle length direction is near, and stores as a second reflection point a reflection point for which the distance is far, the boundary line calculation means calculating, relative to the first reflection point stored in one of left and right processing regions, the vehicle width direction boundary line within the other processing region that is more distant in the vehicle length direction.

According to a twelfth aspect of the present invention, in addition to the tenth or eleventh aspect, when a reflection point is present on the subject vehicle body axis side relative to the vehicle width direction boundary line within the left and right processing regions, the boundary line calculation means corrects the vehicle width direction boundary line so as to pass through the reflection point.

A radar device 11 of an embodiment corresponds to the transceiving means of the present invention.

Effects of the Invention

In accordance with the first aspect of the present invention, when the transceiving means transmits electromagnetic waves so as to scan the predetermined angular range in the horizontal direction around the subject vehicle at predetermined time intervals, and reflected waves of the electromagnetic waves reflected from an object are received, the reflection point detection means detects a reflection point where the electromagnetic waves are reflected from the object based on the result of the reception of reflected waves, the parking space existence determining means determines the existence of a parking space based on pre-stored subject vehicle body dimensional data and the sequence of reflection points, and the parking feasibility determining means determines the feasibility of parking the subject vehicle from the current position to the parking space. In this process, since the parking feasibility determining means determines the feasibility of parking based on the movable range in the subject vehicle width direction calculated by the movable range calculation means based on the sequence of reflection points and the width, in the subject vehicle length direction, of the parking space calculated by the parking space width calculation means based on the sequence of reflection points, it is possible to carry out determination of the feasibility of parking in the parking space with better precision.

Furthermore, in accordance with the second aspect of the present invention, since the processing region setting means sets the predetermined processing region formed from the first range in the subject vehicle width direction and the second range in subject vehicle length direction, it is possible to determine the existence of a parking space while reducing the computational load by restricting the region for which the existence of a parking space is determined to the minimum necessary. Moreover, since the parking space existence determination means determines that a parking space exists when, among reflection points present within the processing region, the distance in the vehicle length direction between the pair of reflection points of the electromagnetic waves with adjacent angles in the horizontal direction is a predetermined value or greater, that is, when objects are disposed discontinuously with distance in subject vehicle length direction, it is possible to accurately determine the existence of a parking space.

Moreover, in accordance with the third aspect of the present invention, when the boundary line calculation means calculates as the vehicle width direction boundary line the straight line for which the sum of the distances in the vehicle width direction to the reflection points present within the processing region is a minimum, and calculates as the vehicle length direction boundary line the straight line for which the sum of the distances in subject vehicle length direction is a minimum, since the movable range calculation means sets a processing region on the left and right with the subject vehicle body axis as the center and calculates, among distances in the vehicle width direction of the left and right vehicle width direction boundary lines, the minimum distance as a movable range, it is possible to calculate the movable range with good precision, and it is possible to prevent an erroneous determination such as parking being possible in spite of there being an insufficient movable range.

Furthermore, in accordance with the fourth aspect of the present invention, when the pair of reflection points is present within the processing region, and of the pair of reflection points the reflection point storage means stores as a first reflection point a reflection point for which the distance in the vehicle length direction is near, and stores as a second reflection point a reflection point that is distant, since the boundary line calculation means calculates, relative to the first reflection point stored in one of left and right processing regions, the vehicle width direction boundary line within the other processing region that is more distant in the vehicle length direction, it is possible to reliably calculate the truly necessary portion of the vehicle width direction boundary line while increasing the speed of processing by reducing the computational load for calculating the vehicle width direction boundary line within the other processing region.

Moreover, in accordance with the fifth aspect of the present invention since, when a reflection point is present on the subject vehicle body axis side relative to the vehicle width direction boundary line within the left and right processing regions, the boundary line calculation means corrects the vehicle width direction boundary line so as to pass through the above reflection point, even if there is an isolated obstacle such as a pole present inside the vehicle width direction boundary line, it is possible to more accurately calculate a movable range while taking the obstacle into consideration.

Furthermore, in accordance with the sixth aspect of the present invention since, when the pair of reflection points is present within a processing region, and of the pair of reflection points the reflection point storage means stores as the first reflection point the reflection point for which the distance in the vehicle length direction is near and stores as the second reflection point the reflection point that is distant, since the intersection point calculation means calculates the intersection point of the vehicle width direction boundary line on the parking space side with the vehicle length direction boundary line calculated based on the second reflection point, and the parking space width calculation means calculates the distance between the first reflection point and the intersection point in the vehicle length direction as the parking space width, it is possible to calculate the parking space width with good precision.

Moreover, in accordance with the seventh aspect of the present invention, since the parking space existence determining means determines that a parking space exists when the distance between the second reflection point and the intersection point in the vehicle width direction is a predetermined value or greater, it is possible to carry out an accurate determination in which the distance back (depth) of the parking space is taken into consideration.

In accordance with the eighth aspect of the present invention, when the transceiving means transmits electromagnetic waves so as to scan the predetermined angular range in the horizontal direction around the subject vehicle at predetermined time intervals, and reflected waves of the electromagnetic waves reflected from an object are received, the reflection point detection means detects a reflection point where the electromagnetic waves are reflected from the object based on the result of the reception of reflected waves, and the parking space existence determining means determines the existence of a parking space based on pre-stored subject vehicle body dimensional data and the sequence of reflection points. In this process, since the processing region setting means sets the predetermined processing region formed from the first range in the subject vehicle width direction and the second range in subject vehicle length direction, it is possible to determine the existence of a parking space while reducing the computational load by restricting the region for which the existence of a parking space is determined to the minimum necessary. Moreover, since the parking space existence determination means determines that a parking space exists when, among reflection points present within the processing region, the distance in the vehicle length direction between the pair of reflection points of the electromagnetic waves with adjacent angles in the horizontal direction is a predetermined value or greater, that is, when objects are disposed discontinuously with distance in subject vehicle length direction, it is possible to accurately determine the existence of a parking space from a position just before the location where the subject vehicle is being parked.

Moreover, in accordance with the ninth aspect of the present invention, the boundary line calculation means calculates as the vehicle width direction boundary line the straight line for which the sum of the distances in the subject vehicle width direction to the reflection points present within the processing region is a minimum, and calculates as the vehicle length direction boundary line the straight line for which the sum of the distances in subject vehicle length direction is a minimum. When the pair of reflection points is present within a processing region, and of the pair of reflection points the reflection point storage means stores as the first reflection point the reflection point for which the distance in the vehicle length direction is near and stores as the second reflection point the reflection point that is far, since the intersection point calculation means calculates the intersection point of the vehicle width direction boundary line on the parking space side with the vehicle length direction boundary line calculated based on the second reflection point, and the parking space existence determining means determines that a parking space exists when the distance between the second reflection point and the intersection point in the vehicle width direction is a predetermined value or greater, it is possible to carry out an accurate determination in which the distance back (depth) of the parking space is taken into consideration.

Furthermore, in accordance with the tenth aspect of the present invention, when the transceiving means transmits electromagnetic waves so as to scan the predetermined angular range in the horizontal direction around the subject vehicle at predetermined time intervals, and reflected waves of the electromagnetic waves reflected from an object are received, the reflection point detection means detects a reflection point where the electromagnetic waves are reflected from the object based on the result of the reception of reflected waves, and the movable range calculation means calculates the movable range for parking in the subject vehicle width direction based on the sequence of reflection points. In this process, when the processing region setting means sets the predetermined processing region formed from the first range in the subject vehicle width direction and the second range in subject vehicle length direction, the boundary line calculation means calculates as the vehicle width direction boundary line the straight line for which the sum of the distances in the subject vehicle width direction to the reflection points present within the processing region is a minimum, and calculates as the vehicle length direction boundary line the straight line for which the sum of the distances in subject vehicle length direction is a minimum, since the movable range calculation means sets a processing region on the left and right with the subject vehicle body axis as the center and calculates, among distances in the vehicle width direction of the left and right vehicle width direction boundary lines, the minimum distance as a movable range, it is possible to calculate the movable range with good precision, and it is possible to prevent an erroneous determination such as parking being possible in spite of there being an insufficient movable range.

Moreover, in accordance with the eleventh aspect of the present invention, when the pair of reflection points is present within the processing region, and of the pair of reflection points, the reflection point storage means stores as a first reflection point a reflection point for which the distance in the vehicle length direction is near, and stores as a second reflection point a reflection point that is distant, since the boundary line calculation means calculates, relative to the first reflection point stored in one of left and right processing regions, the vehicle width direction boundary line within the other processing region that is more distant in the vehicle length direction, it is possible to reliably calculate the truly necessary portion of the vehicle width direction boundary line while increasing the speed of processing by reducing the computational load for calculating the vehicle width direction boundary line within the other processing region.

Furthermore, in accordance with the twelfth aspect of the present invention, since, when a reflection point is present on the subject vehicle body axis side relative to the vehicle width direction boundary line within the left and right processing regions, the boundary line calculation means corrects the vehicle width direction boundary line so as to pass through the above reflection point, even if there is an isolated obstacle such as a pole present inside the vehicle width direction boundary line, it is possible to more accurately calculate a movable range while taking the obstacle into consideration.

EXPLANATION OF REFERENCE NUMERALS AND SYMBOLS

Ly Vehicle width direction boundary line
Lx Vehicle length direction boundary line M1 Reflection point detection means
M2 Reflection point storage means
M3 Processing region setting means
M4 Boundary line calculation means
M5 Intersection point calculation means
M6 Parking space existence determining means
M7 Parking space width calculation means
M8 Movable range calculation means
M9 Parking feasibility determining means
P1 First reflection point
P2 Second reflection point
P3 Intersection point
R Processing region
Sp Parking space
11 Radar device (transceiving means)

BEST MODE FOR CARRYING OUT THE INVENTION

Figure 1:
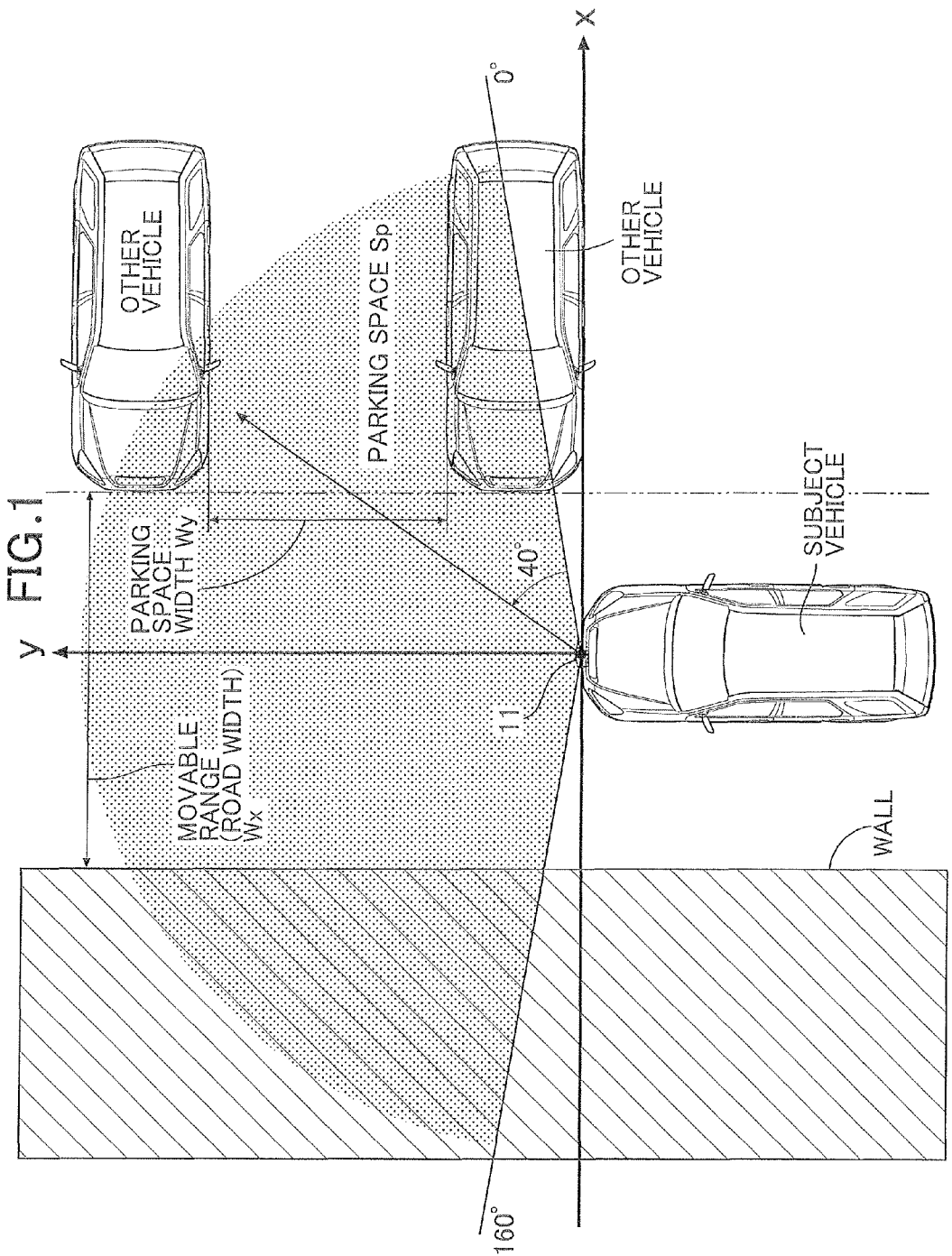
FIG. 1 is a diagram showing the positional relationship between a subject vehicle, other vehicles, a road, a wall, and a parking space. (first embodiment)

A mode for carrying out the present invention is explained below by reference to the attached drawings.
First Embodiment As shown in FIG. 1, a vehicular parking feasibility determining system of the present embodiment determines whether or not a parking space that a subject vehicle can be parked in is present by detecting, by means of a radar device 11 provided at the front end of the subject vehicle, an obstacle such as another vehicle or wall present in a region of 80° to each of the left and right, that is, a total of 160°, within a horizontal plane with the subject vehicle body axis as the center. In this example, there is a wall on the left side of a road where the subject vehicle stops, there are a plurality of other vehicles parking side by side on the right side, and a parking space Sp exists between the plurality of other vehicles.

An x-y rectangular coordinate system with the position of the radar device 11 as the origin is fixed to the subject vehicle; its y axis coincides with the vehicle body axis, and its x axis is perpendicular to the y axis. The radar device 11 scans an angular range of 160° in the horizontal direction by means of electromagnetic waves, and its resolution is 0.5°. Therefore, in an angular range of 160°, electromagnetic waves are transmitted to 321 directions, reflected waves thereof reflected from an object are received, and the x-y coordinates of reflection points of electromagnetic waves are thus detected. For example, in FIG. 1, an object that is present in a direction 40° anticlockwise from the right end (0° direction) of the angular range of 160° is scanned by the $81^{st}$ electromagnetic wave. Furthermore, there is a limit for the distance at which an object can be detected; for example, an object that is distant from the radar device 11 by 15 m or greater cannot be detected due to the intensity of the reflected waves being weakened.

Figure 2:
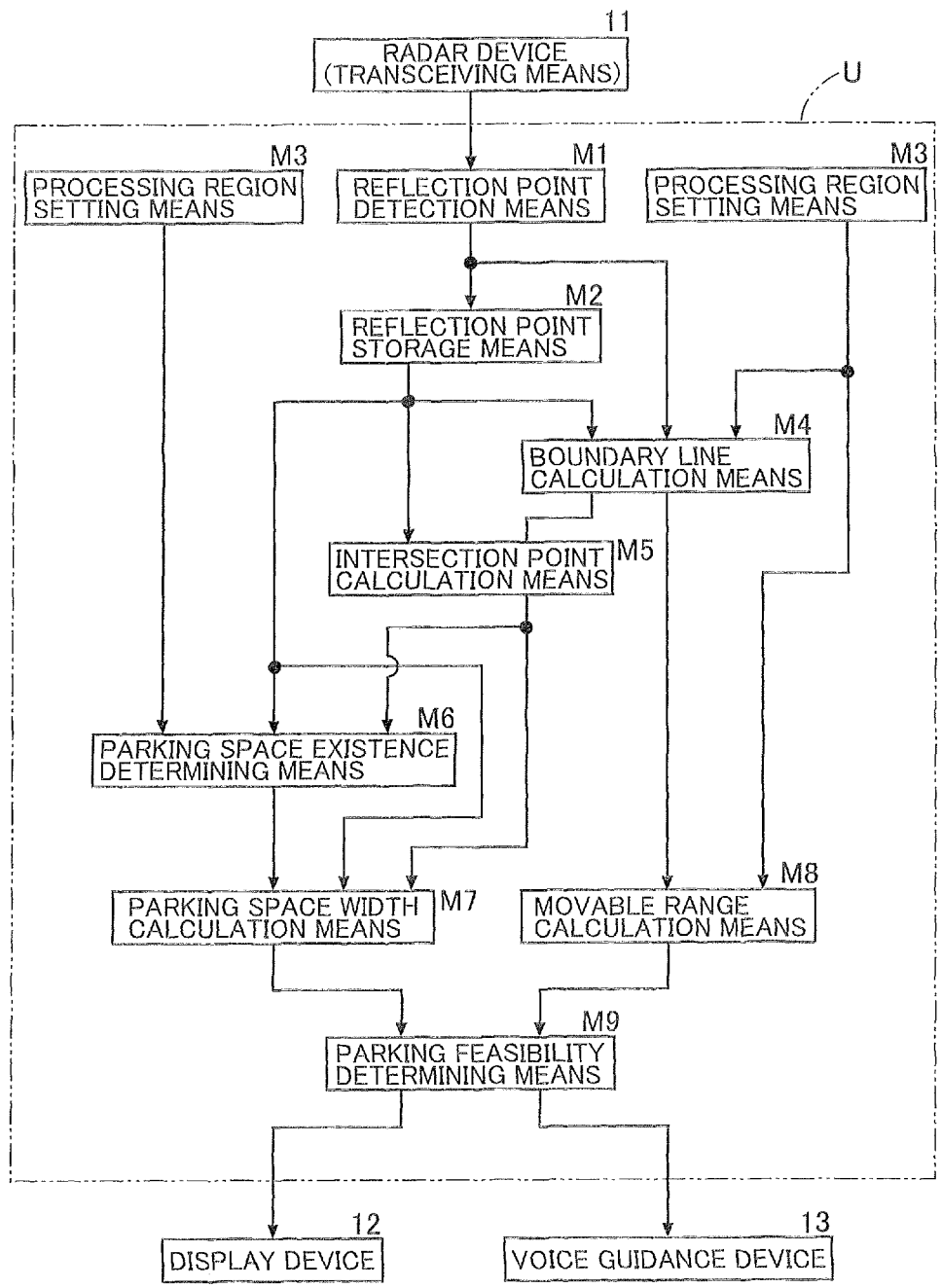
FIG. 2 is a block diagram showing a circuit of an electronic control unit. (first embodiment)

As shown in FIG. 2, an electronic control unit U of the vehicular parking feasibility determining system has connected thereto, in addition to the radar device 11, a display device 12 and a voice guidance device 13. The electronic control unit U includes reflection point detection means M1, reflection point storage means M2, processing region setting means M3, boundary line calculation means M4, intersection point calculation means M5, parking space existence determining means M6, parking space width calculation means M7, movable range calculation means M8, and parking feasibility determining means M9, the reflection point detection means M1 having connected thereto the radar device 11, and the parking feasibility determining means M9 having connected thereto the display device 12 and the voice guidance device 13.

The operation of the vehicular parking feasibility determining system is now briefly explained by reference to a flowchart of a main routine shown in FIG. 3.

First, in step S1 the reflection point detection means M1 (see FIG. 2) obtains reflection point data of obstacles based on detection results of the radar device 11. In the present embodiment, the obstacles are other vehicles parked side by side and a wall, and the reflection point data are given as x-y coordinates of reflection points at which electromagnetic waves transmitted toward the other vehicles parked side by side and the wall at intervals of 0.5° are reflected.

In the subsequent step S2 it is determined whether or not a sufficient amount of reflection point data for determining parking feasibility has been obtained from obstacles present on the right side of the subject vehicle that has stopped on the road, and it is determined by the parking space existence determining means M6 (see FIG. 2) whether or not a parking space Sp in which the subject vehicle can be parked is present. Even if it is determined by the parking space existence determining means M6 that a parking space Sp is present on the right side of the subject vehicle, since parking might be impossible in the parking space Sp when a width Wx of the road is narrow, even if the parking space Sp is present, parking therein is not always possible.

In the subsequent step S3 it is determined whether or not a sufficient amount of reflection point data for determining parking feasibility has been obtained from obstacles present on the left side of the subject vehicle that has stopped on the road, and it is determined by the parking space existence determining means M6 whether or not a space in which the subject vehicle can be parked is present. The contents of step S3 are substantially the same as contents of step S2, the only difference being that processing (step S2) is based on the reflection point data on the right side of the subject vehicle body axis whereas processing (step S3) is based on the reflection point data on the left side of the subject vehicle body axis.

In the subsequent step S4 the left side of a subject vehicle movable range, that is, the position of a boundary line on the left side of the width Wx of the road (this is defined as a left side vehicle width direction boundary line Ly), is calculated by the boundary line calculation means M4 (see FIG. 2), and in step S5, of two angles on which the parking space Sp on the right side is in contact with the road, the coordinates of the corner that is distant from the subject vehicle (this is defined as an intersection point P3) are calculated by the intersection point calculation means M5 (see FIG. 2), and a width Wy of the parking space Sp is thus calculated.

In the subsequent step S6 the right side of a subject vehicle movable range that is, the position of a boundary line on the right side of the width Wx of the road (this is defined as a right side vehicle width direction boundary line Ly), is calculated by the boundary line calculation means M4 (see FIG. 2), and in step S7, of two corners at which the parking space Sp on the left side is in contact with the road, the coordinates of the corner that is distant from the subject vehicle (this is defined as the intersection point P3) are calculated by the intersection point calculation means M5 (see FIG. 2), and the width Wy of the parking space Sp is thus calculated.

The contents of step S6 are substantially the same as contents of step S4, the only difference being that processing (step S4) is based on the reflection point data on the left side of the subject vehicle body axis whereas processing (step S6) is based on the reflection point data on the right side of the subject vehicle body axis. Furthermore, the contents of step S7 are substantially the same as contents of step S5, the only difference being that processing (step S5) is based on the reflection point data on the right side of the subject vehicle body axis whereas processing (step S7) is based on the reflection point data on the left side of the subject vehicle body axis.

Figure 4:
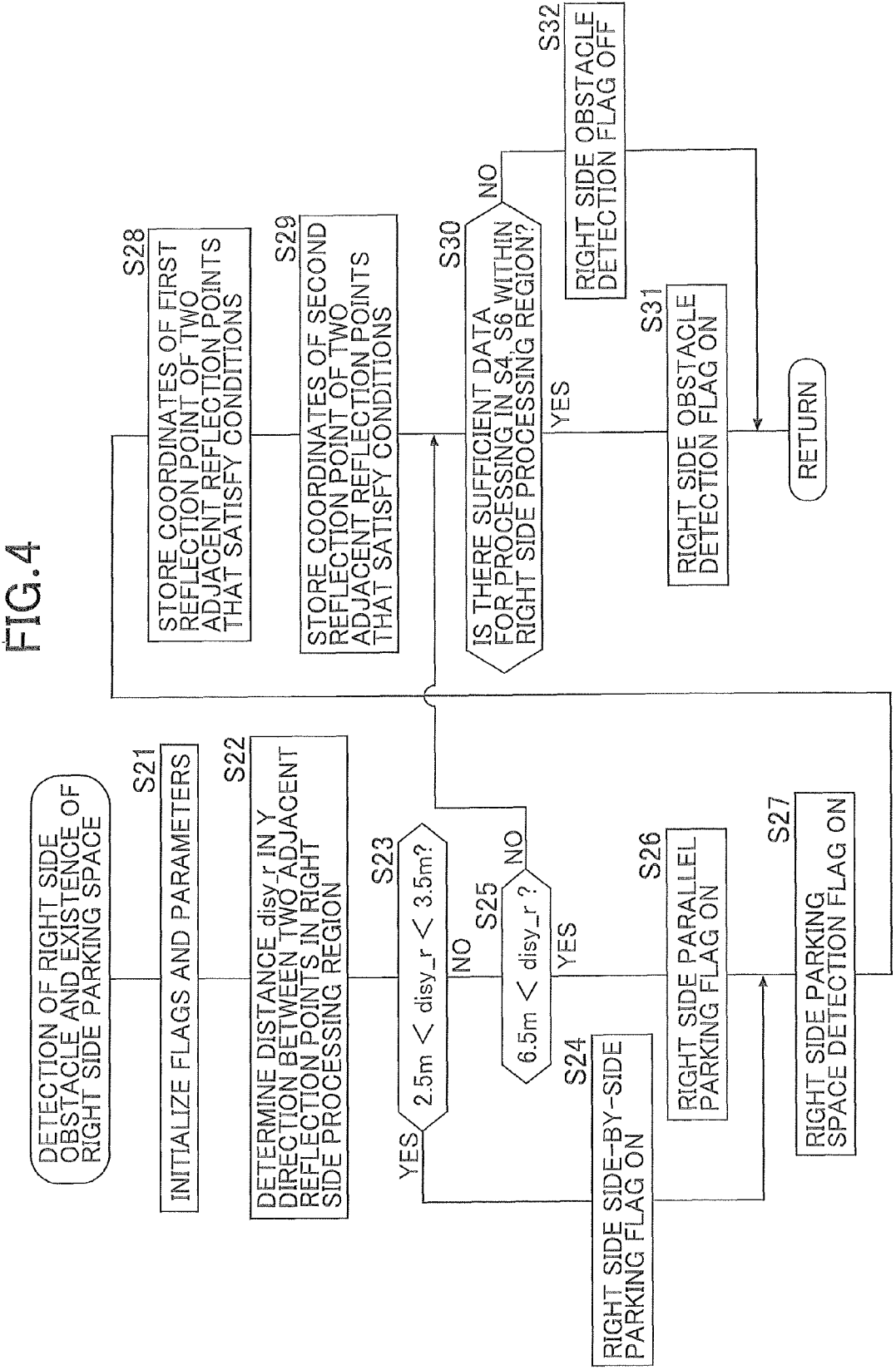
FIG. 4 is a flowchart of a subroutine of step S2 of the main routine. (first embodiment)

FIG. 4 shows a subroutine of the above step S2 (detection of right side obstacle and existence of right side parking space); first, in step S21 each flag and each parameter are initialized, and in step S22 a distance disy_r in the y axis direction between two adjacent reflection points in a processing region on the right side of the subject vehicle body axis is calculated.

That is, as shown in FIG. 1, a case is considered in which other vehicles are parked side by side on the right side of the subject vehicle with the parking space Sp interposed therebetween. In order to suppress the amount of data processed, in FIG. 7 the processing region setting means M3 (see FIG. 2) sets a rectangular processing region R at a position where there is a high possibility of the parking space Sp being present. In the embodiment, the processing region R is such that the x coordinate is in the range of 1 m to 5 m and the y coordinate is in the range of 0 m to 10 m. A plurality of + marks within the processing region R denote reflection points of electromagnetic waves from obstacles (the two other vehicles parked side by side), and all of the distances disy_r in the y axis direction of the two adjacent reflection points are calculated.

In the subsequent step S23, if a pair of reflection points for which the distance disy_r satisfies 2.5 m<disy_r<3.5 m is present, the parking space existence determining means M6 (see FIG. 2) determines that a parking space Sp having a width of 2.5 m to 3.5 m in which side-by-side parking is possible is present between the two other vehicles parked side by side, and in step S24 a right side side-by-side parking flag is turned ON. Furthermore, in step S25 if a pair of reflection points for which the distance disy_r satisfies 6.5<disy_r is present, the parking space existence determining means M6 determines that a parking space Sp having a width of greater than 6.5 m in which parallel parking is possible is present between two other vehicles that are parked side by side, and in step S26 a right side parallel parking flag is turned ON.

Figure 7:
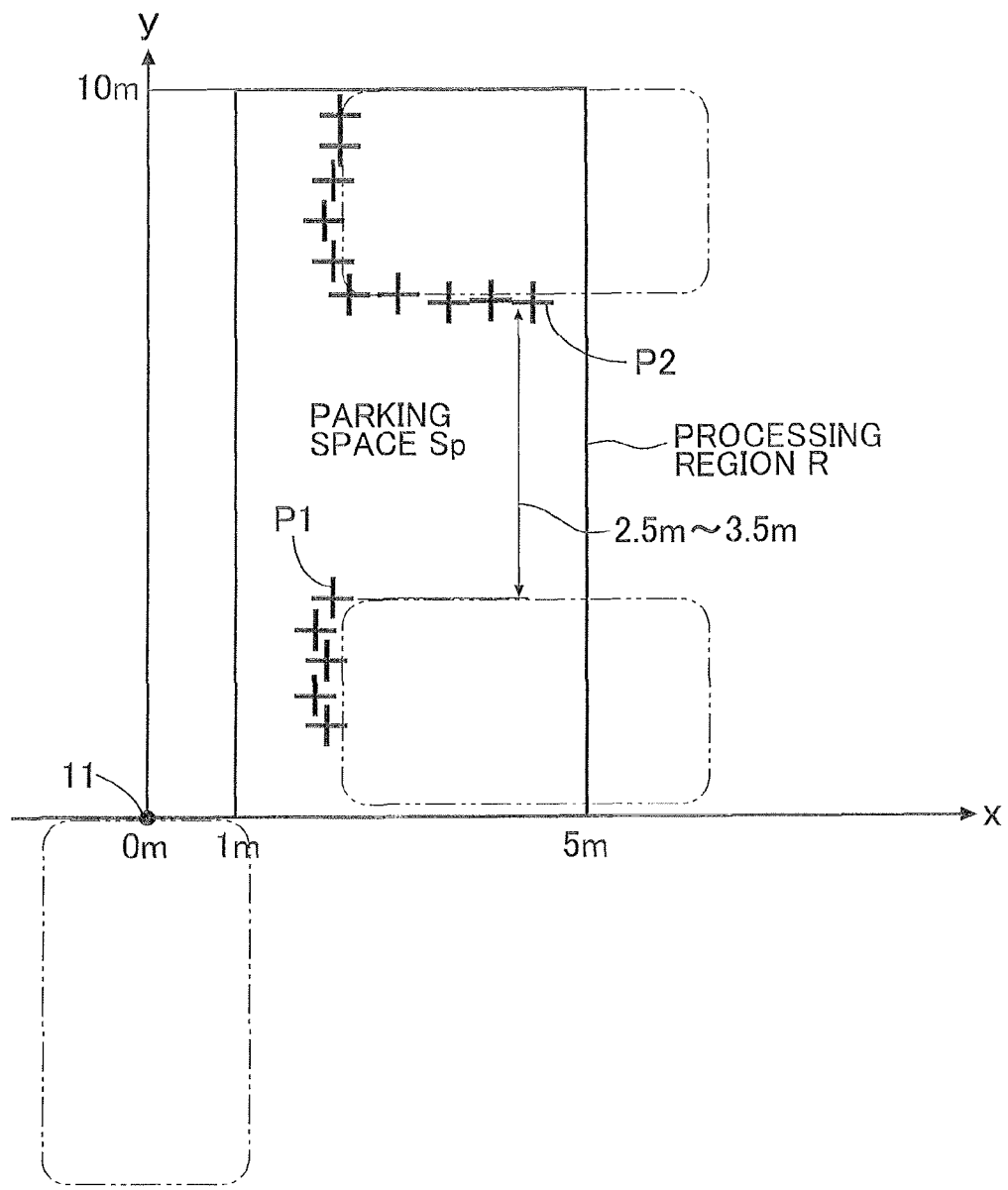
FIG. 7 is an explanatory diagram showing a distribution of reflection points within a processing region. (first embodiment)

In step S27 a right side parking space detection flag is turned ON, and in step S28 among the two reflection points that satisfy the conditions of steps S23 and S25 above the coordinates of a first reflection point P1 are stored. As shown in FIG. 7, the first reflection point P1 corresponds to the front right corner of the other vehicle on the side close to the subject vehicle. In the subsequent step S29, among the two reflection points that satisfy the conditions of steps S23 and S25 above, the coordinates of a second reflection point P2 are stored. As shown in FIG. 7, the second reflection point P2 corresponds to a point on the left side face of the other vehicle that is distant from the subject vehicle.

In the subsequent step S30 it is determined whether or not a sufficient number of reflection points for carrying out processing of steps S4 and S6 is present within the right side processing region R; if a sufficient number of reflection points is present then in step S31 a right side obstacle detection flag is turned ON, and if a sufficient number is not present then in step S32 the right side obstacle detection flag is turned OFF.

The subroutine of step S2 above (right side obstacle and right side parking space existence detection) is explained above; a subroutine of step S3 above (left side obstacle and left side parking space existence detection) is substantially the same as that of step S2 above except that left and right are exchanged, and the explanation thereof is not repeated.

Figure 5:
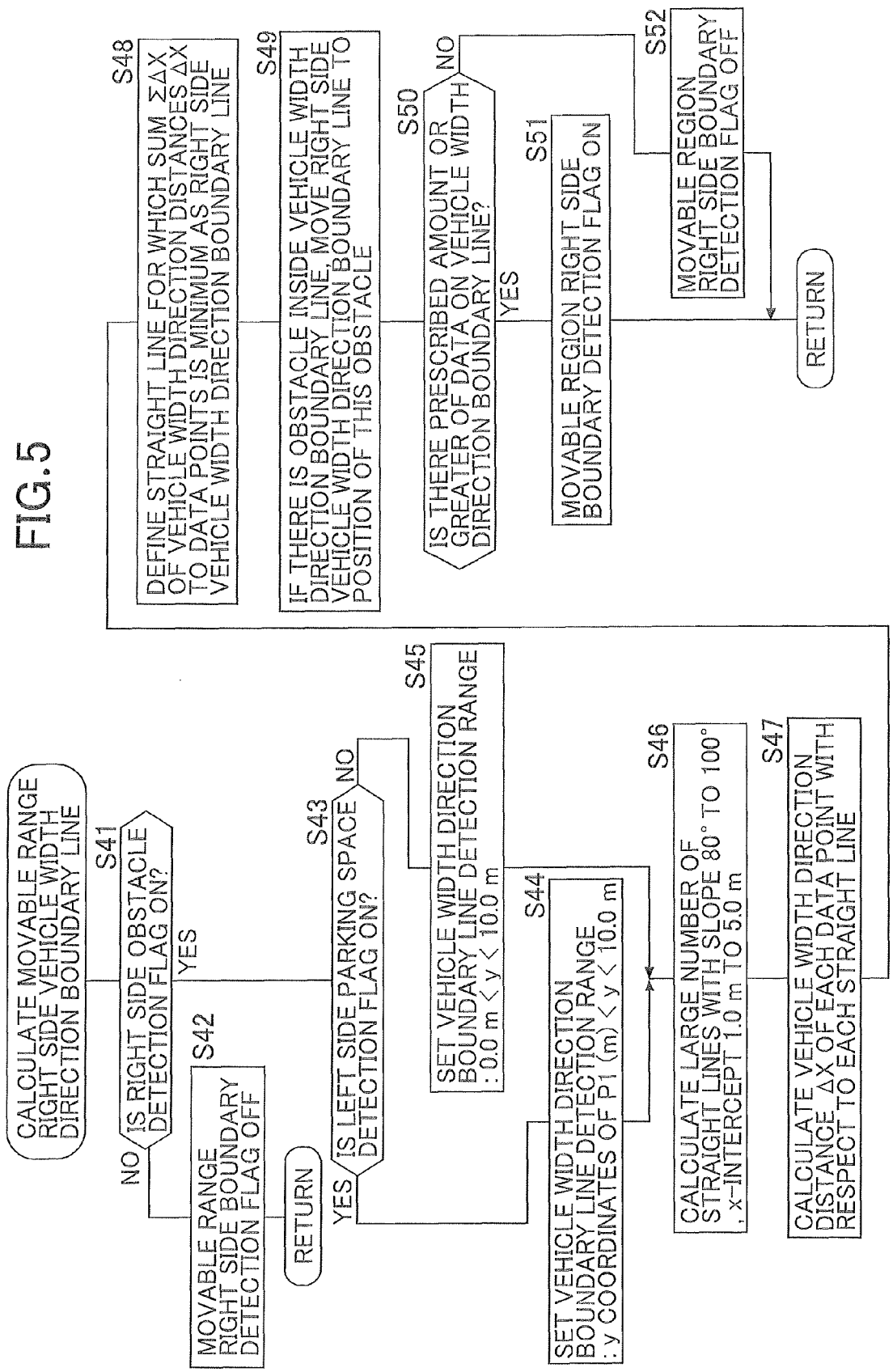
FIG. 5 is a flowchart of a subroutine of step S6 of the main routine. (first embodiment)

FIG. 5 shows a subroutine of step S6 above (movable range right side vehicle width direction boundary line calculation); first, if in step S41 the right side obstacle detection flag is not ON, then in step S42 a movable range right side boundary detection flag is turned OFF. In step S41 above, when the right side obstacle detection flag is ON, if in step S43 the left side parking space detection flag is ON, that is, a parking space Sp exists on the left side of the subject vehicle body axis, then in step S44 the range of the vehicle width direction boundary line detection is set in the range: y coordinate of first reflection point P1<y<10m.

Figure 8:
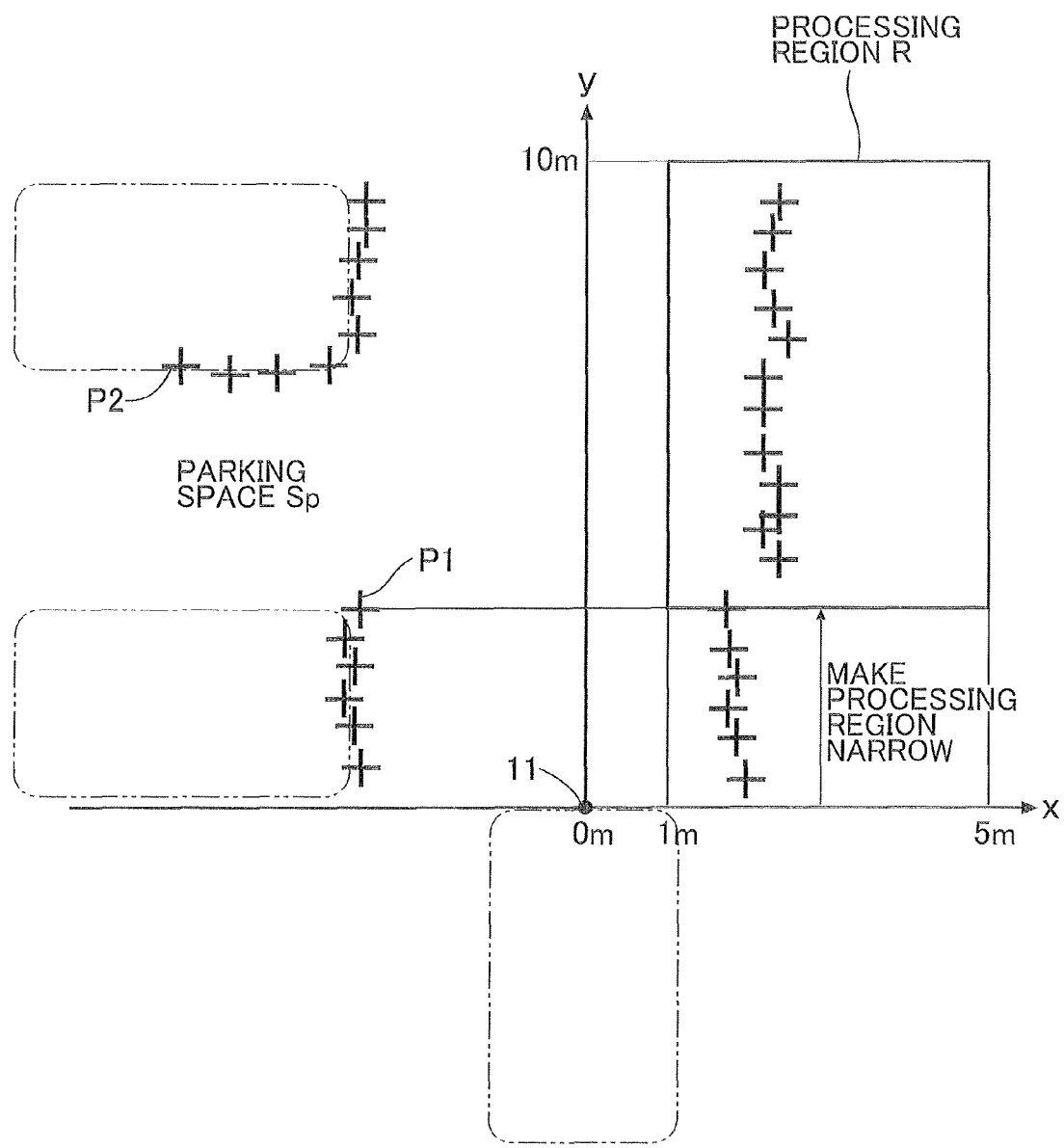
FIG. 8 is an explanatory diagram when a processing region on the side opposite to a parking space is narrowed. (first embodiment)

That is, in FIG. 8, a line that is parallel to the x axis on the side, close to the subject vehicle, of the processing region R on the right side is moved in a direction away to the position of the y coordinate of the first point P1 of the parking space Sp on the left side, thus making a correction in a direction so as to narrow the processing region R. The reason therefor is as follows. The right side vehicle width direction boundary line Ly is for determining whether or not the road width Wx is sufficient for carrying out parking; when the parking space Sp on the left side is established, since the feasibility of parking is not affected even if the width Wx of the road before reaching the y coordinate of the first reflection point P1 is narrow, the computational load is reduced by narrowing the processing region R, and determination is carried out more precisely from a truly necessary region.

On the other hand, if in step S43 above the left side parking space detection flag is not ON, that is, if there is no parking space Sp on the left side of the subject vehicle body axis, in step S45 the range of the vehicle width direction boundary line detection remains as a normal processing region R (see FIG. 7).

Figure 9:
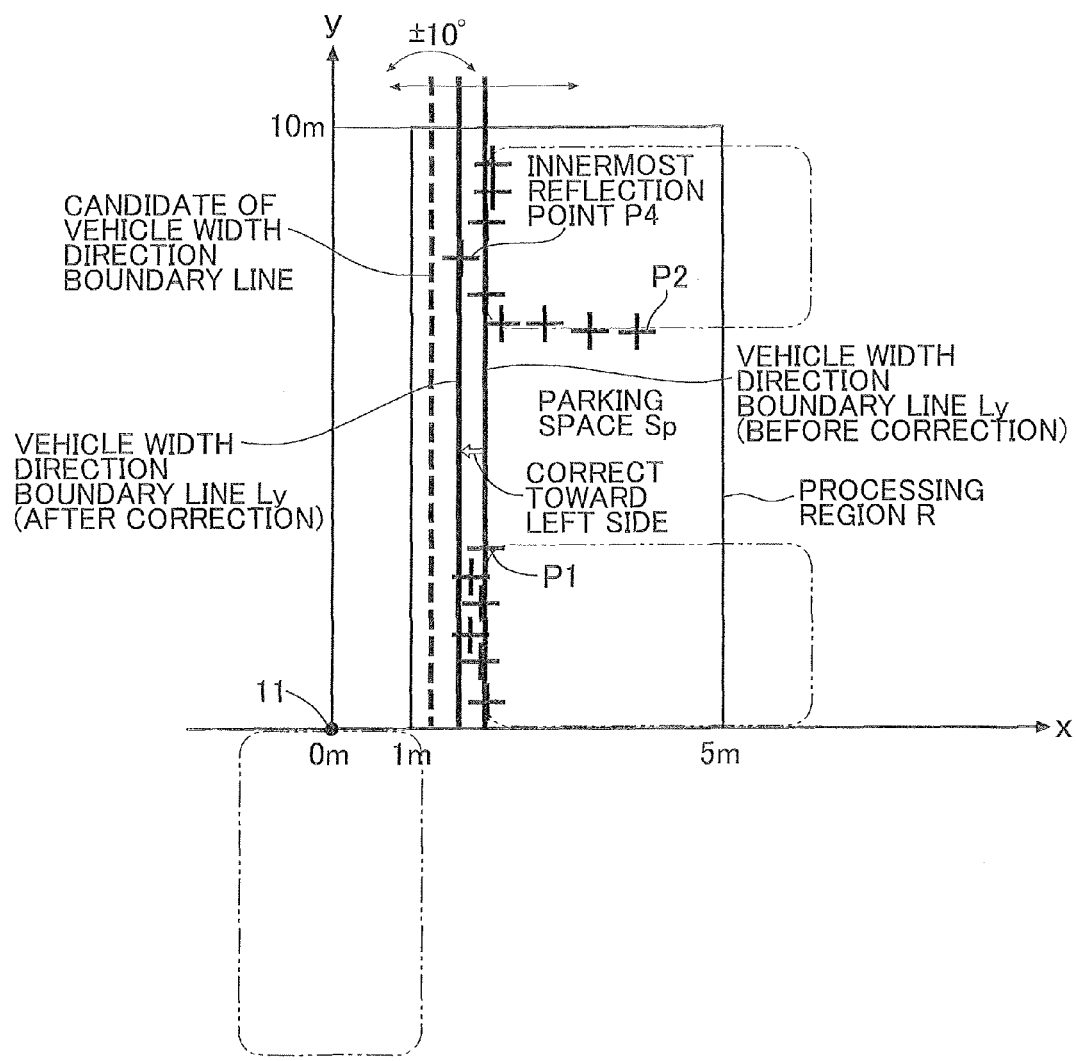
FIG. 9 is an explanatory diagram for a method for setting a vehicle width direction boundary line. (first embodiment)

In the subsequent step S46, as shown in FIG. 9, a large number of straight lines having a slope of 80° to 100° and an x-intercept of 1.0 m to 5.0 m within the right side processing region R (see broken lines) are calculated as candidates for the right side vehicle width direction boundary line Ly. The slope of the straight line is changed in, for example, steps of 1°, and the x-intercept of the straight line is changed in, for example, steps of 0.1 m. In the subsequent step S47 the distances Δx between each candidate for the vehicle width direction boundary line Ly and each reflection point are calculated and, following this, in step S48 the sum ΣΔx of the distances Δx is calculated and one straight line for which the sum ΣΔx becomes a minimum is determined as the right side vehicle width direction boundary line Ly.

If in the subsequent step S49, as shown in FIG. 9, a reflection point is present on the inside of the vehicle width direction boundary line Ly (the side close to the subject vehicle body axis), the vehicle width direction boundary line Ly is moved parallel in the x axis direction up to the position of a reflection point P4 that is on the innermost side, and this is determined as the final vehicle width direction boundary line Ly. The reason therefor is that if a reflection point (obstacle) is present on the inside of the vehicle width direction boundary line Ly, there is a possibility that parking in the parking space Sp will become impossible due to obstruction by the obstacle.

If in the subsequent step S50 the number of reflection points on the vehicle width direction boundary line Ly is a prescribed value or greater then in step S51 a movable range right side boundary detection flag is turned ON, and if the number is less than the prescribed value then in step S52 the movable range right side boundary detection flag is turned OFF.

The subroutine of step S6 above (movable range right side vehicle width direction boundary line calculation) is explained above; a subroutine of step S4 above (movable range left side vehicle width direction boundary line calculation) is substantially the same as that of step S6 above except that left and right are exchanged, and the explanation thereof is not repeated.

Figure 6:
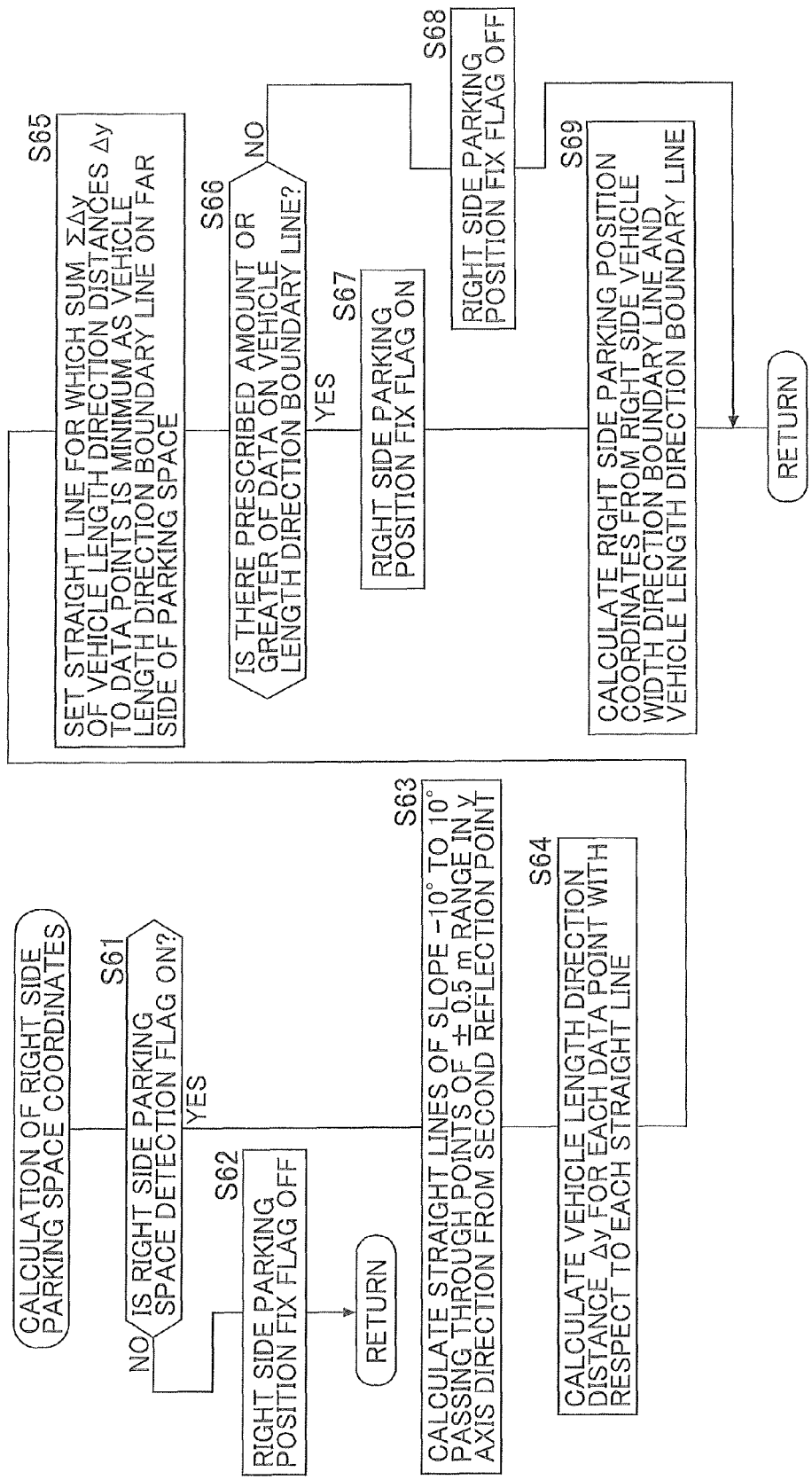
FIG. 6 is a flowchart of a subroutine of step S5 of the main routine. (first embodiment)
Figure 10:
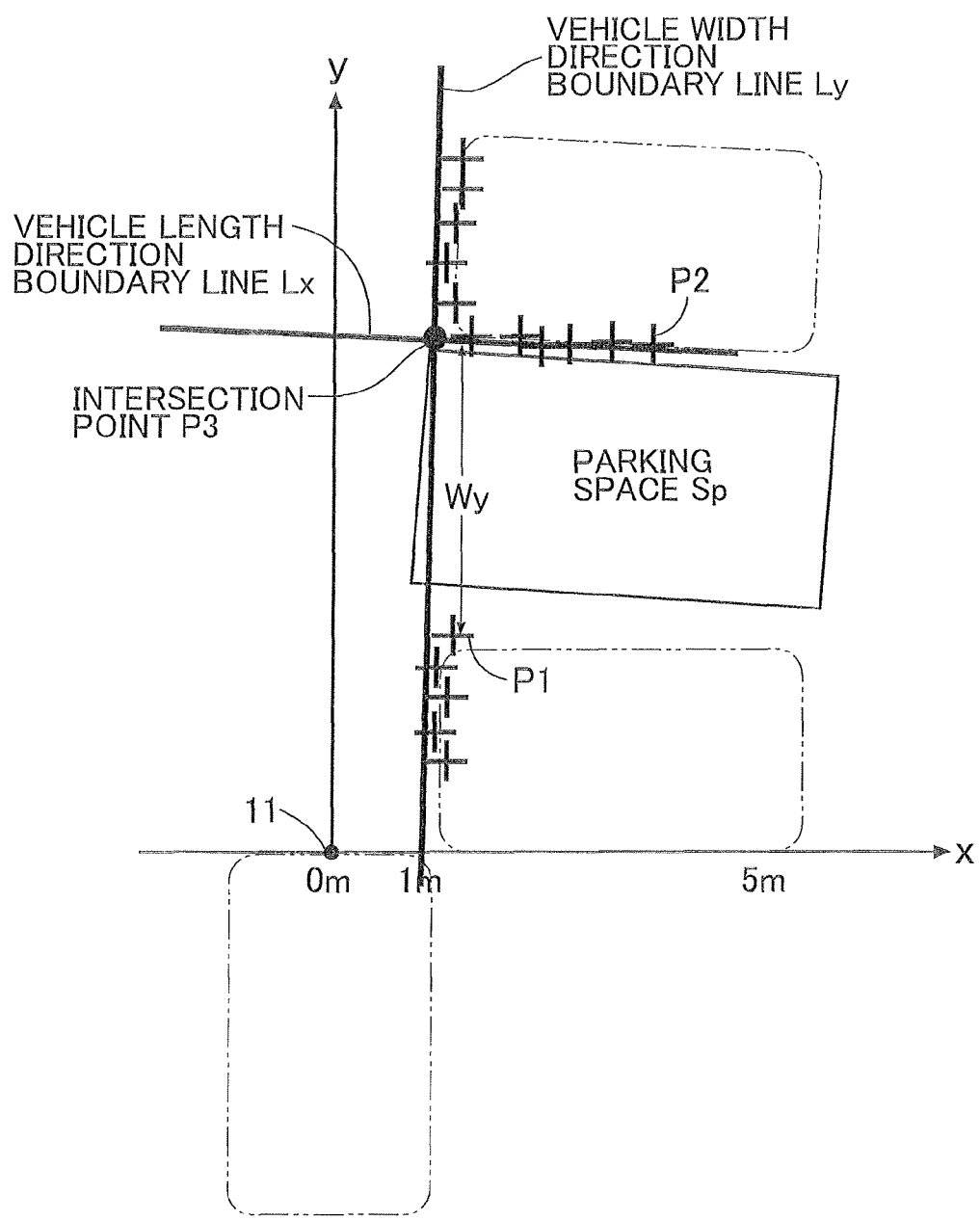
FIG. 10 is an explanatory diagram for a method for setting a vehicle length direction boundary line on the far side of the parking space. (first embodiment)

FIG. 6 shows a subroutine of step S5 above (right side parking space coordinates calculation); first, if in step S61 the right side parking space detection flag is not ON, then in step S62 a right side parking position FIX flag is turned OFF. When in step S61 above the right side parking space detection flag is ON, as shown in FIG. 10, in step S63 a large number of straight lines (see broken lines) having a slope of −10° to 10° and passing through a range of ±0.5 m from the second reflection point P2 in the y axis direction are calculated as candidates for a right side vehicle length direction boundary line Lx. The slope of the straight line is changed in for example steps of 1°, and the position in the y axis direction of the straight line is changed in for example steps of 0.1 m. In the subsequent step S64 the distances Δy between each candidate for the vehicle length direction boundary line Lx and each reflection point are calculated and, following this, in step S65 the sum ΣΔy of the distances Δy is calculated and one straight line for which the sum ΣΔy becomes a minimum is determined as the vehicle length direction boundary line Lx on the far side of the parking space Sp.

If in the subsequent step S66 the number of reflection points on the vehicle length direction boundary line Lx is a prescribed value or greater then in step S67 a right side parking position FIX flag is turned ON, and if the number is less than the prescribed value then in step S68 the right side parking position FIX flag is turned OFF.

In the subsequent step S69 the intersection point calculation means M5 (see FIG. 2) calculates as right side parking position coordinates an intersection point P3 between the right side vehicle width direction boundary line Ly and the vehicle length direction boundary line Lx.

The subroutine of step S5 above (right side parking space coordinates calculation) is explained above; a subroutine of step S7 above (left side parking space coordinates calculation) is substantially the same as that of step S5 above except that left and right are exchanged, and the explanation thereof is not repeated.

Figure 3:
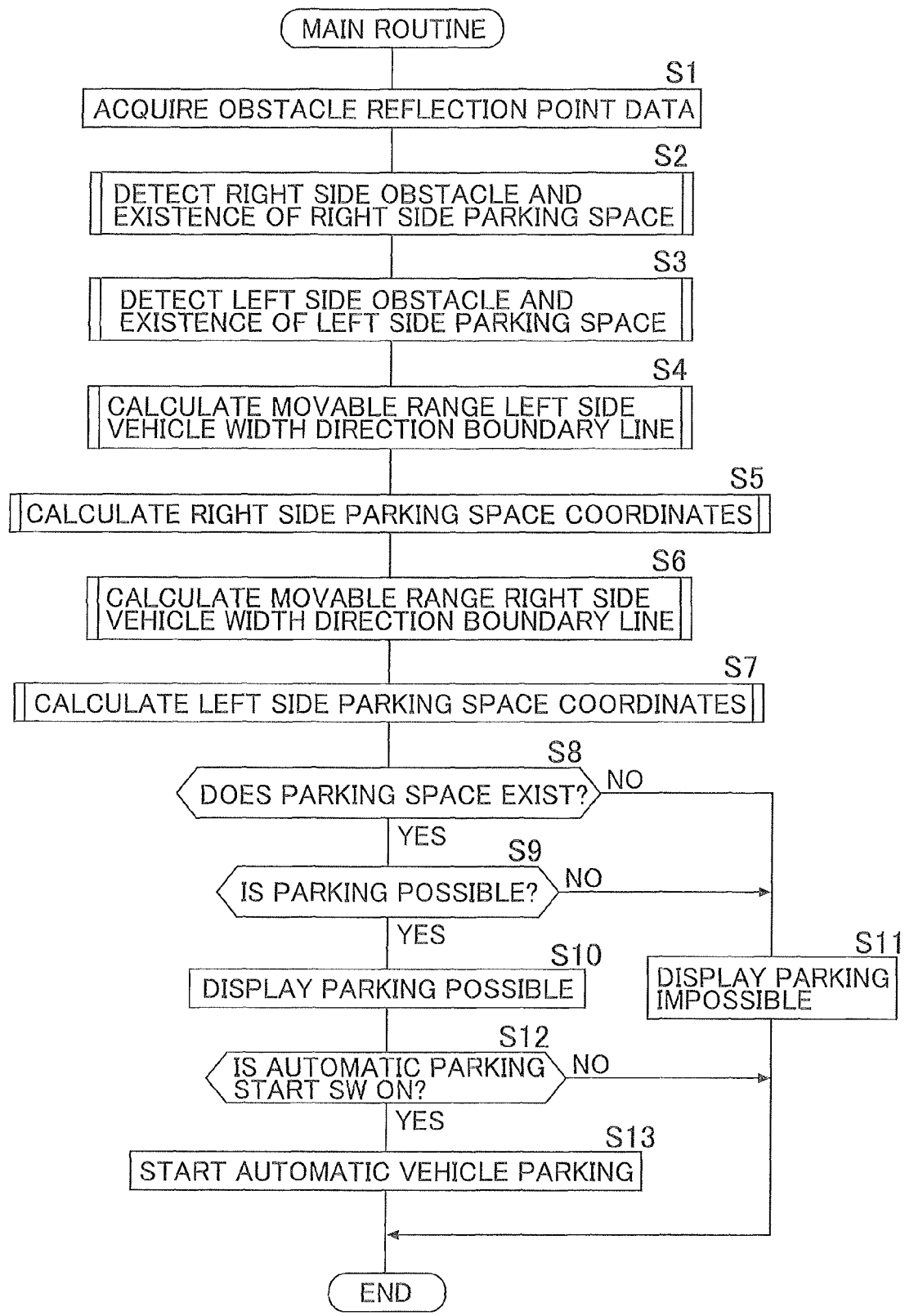
FIG. 3 is a flowchart of a main routine. (first embodiment)

Returning to the flowchart of FIG. 3, in step S8 it is determined whether or not there is a parking space Sp on the right side or the left side of the subject vehicle. In steps S2 and S3 above it is determined that there is a parking space Sp when disy_r satisfies 2.5 m<disy_r<3.5 m or 6.5 m<disy_r and, in addition thereto, the distance between the intersection point P3 and the second reflection point P2 in the x axis direction being a predetermined value or greater may be a necessary condition. The reason therefor is that if the distance between the intersection point P3 and the second reflection point P2 is short, when the subject vehicle is parked in the parking space Sp, there is a possibility that the front of the vehicle body of the subject vehicle will stick out from the parking space Sp into the road.

Figure 11:
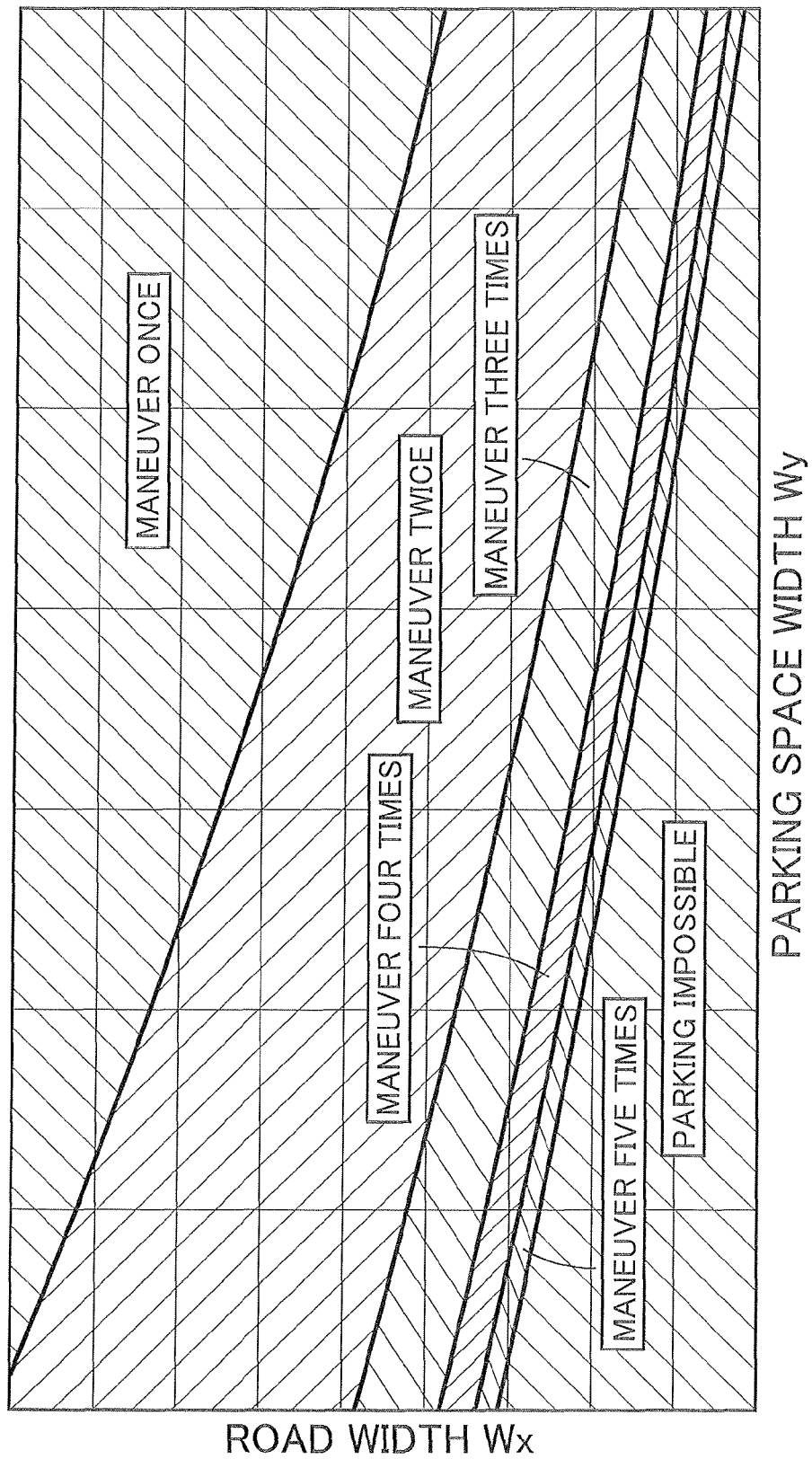
FIG. 11 is a diagram showing a map for carrying out determination of parking feasibility. (first embodiment)

In the subsequent step S9 whether or not parking is possible in the parking space Sp is determined by the parking feasibility determining means M9 using a map of FIG. 11. This map employs as parameters the width Wy of the parking space Sp determined by the parking space width determining means M7 (see FIG. 2) and the road width Wx (movable range) determined by the movable range determining means M8 (see FIG. 2); the width Wy of the parking space Sp is calculated as the distance between the first reflection point P1 and the intersection point P3, and the road width Wx (movable range) is calculated as the minimum value for the distance between the right side vehicle width direction boundary line Ly and the left side vehicle width direction boundary line Ly.

In a region where the width Wy of the parking space Sp and the road width Wx are narrow, parking becomes impossible, and in a region where the width Wy of the parking space Sp and the road width Wx are wide, parking becomes feasible. Even in a region where parking is possible, the narrower the width Wy of the parking space Sp and the road width Wx, the larger the required number of repetitions of maneuvering back-and-forth; the upper limit for the number of repetitions of maneuvering back-and-forth is 5, and when the required number of repetitions of maneuvering back-and-forth is 6 or more, parking is defined as being infeasible.

Figure 12:
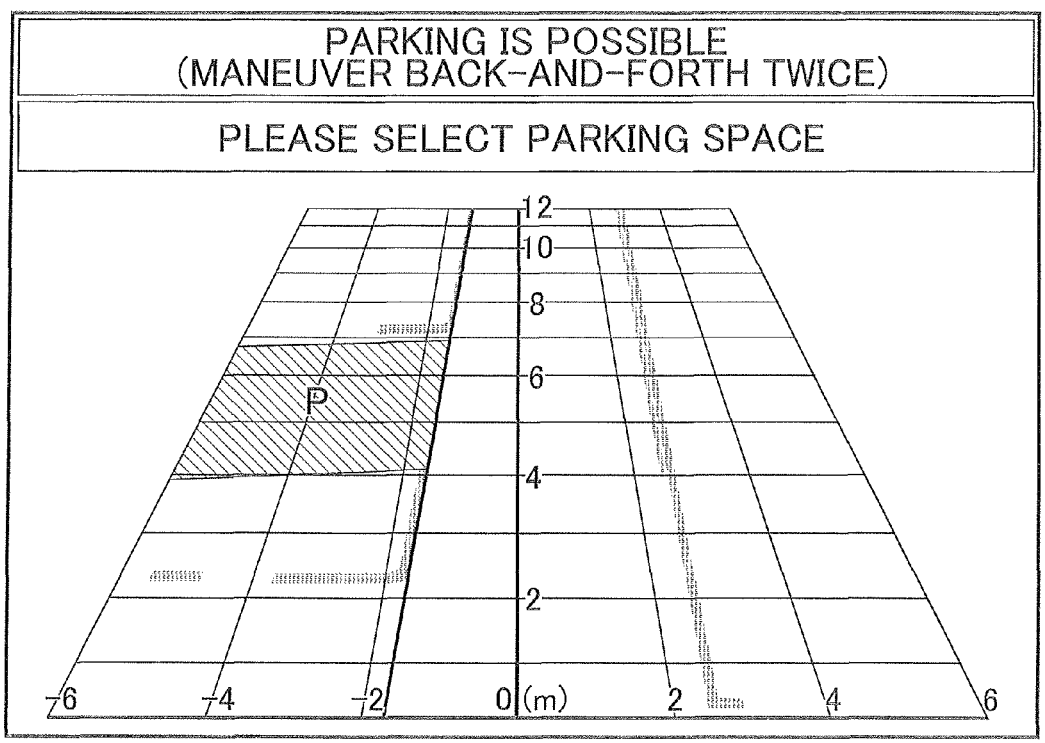
FIG. 12 is a diagram showing a parking feasible screen displayed on a display device. (first embodiment)
Figure 13:
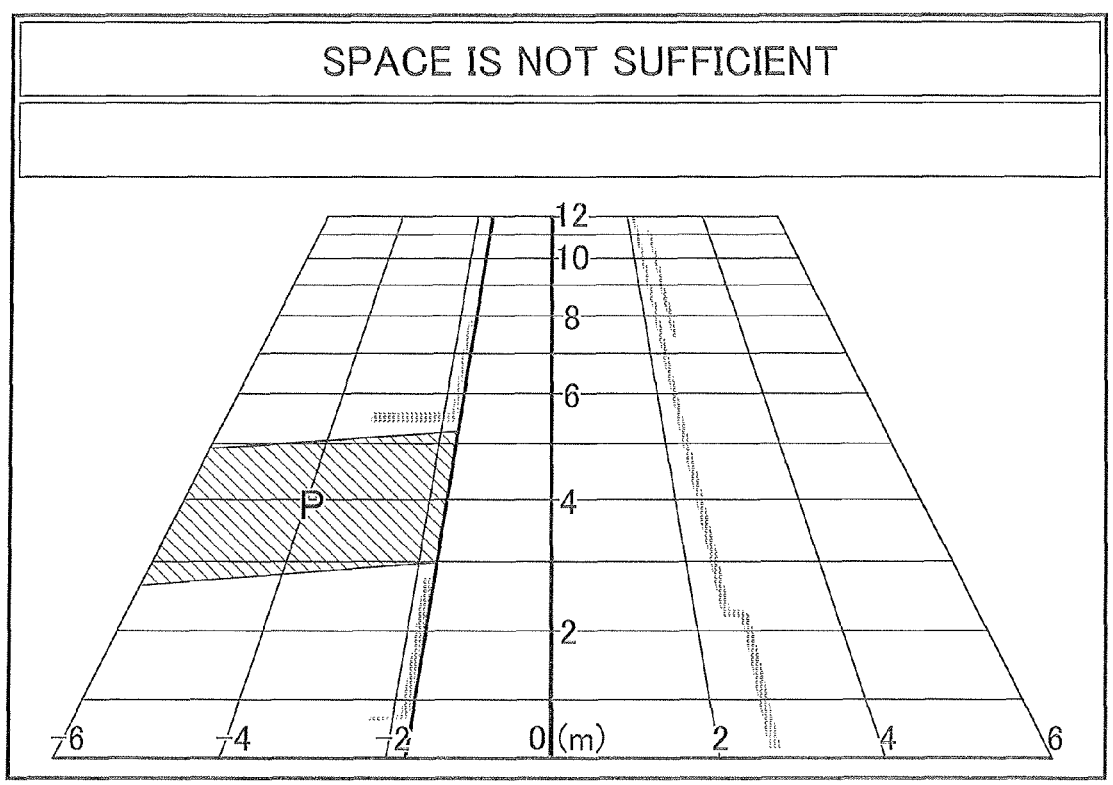
FIG. 13 is a diagram showing a parking infeasible screen displayed on the display device. (first embodiment)

When parking is feasible, in step S10 the display device 12 displays that parking is possible (see FIG. 12) and, in addition, the voice guidance device 13 notifies the result of parking being determined possible. When parking is impossible, in step S11 the display device 12 displays that parking is infeasible (see FIG. 13) and, in addition, the voice guidance device notifies the result of parking being determined infeasible. When an automatic parking start switch is turned ON in step S12 in the case of parking being feasible, in step S13 automatic parking in the parking space Sp is started.

An embodiment of the present invention is explained above, but the present invention is not limited to the above-mentioned embodiment and may be modified in a variety of ways as long as the modifications do not depart from the spirit and scope thereof.

For example, in the embodiment, when parking is determined as being feasible, automatic parking is carried out, but parking may be carried out by a manual operation.

The invention claimed is:

1. A vehicular parking feasibility determining system comprising
    transceiving means (11) that transmits electromagnetic waves so as to scan a predetermined angular range in the horizontal direction around a subject vehicle at predetermined time intervals, and receives reflected waves of the electromagnetic waves reflected from an object,
    reflection point detection means (M1) that detects a reflection point at which electromagnetic waves are reflected from the object based on a result of reception of reflected waves by the transceiving means (11),
    parking space existence determining means (M6) that determines the existence of a parking space (Sp) based on pre-stored subject vehicle body dimensional data and a sequence of the reflection points,
    parking feasibility determining means (M9) that determines the feasibility of parking the subject vehicle from a current position thereof to the parking space (Sp),
    movable range calculation means (M8) that calculates a movable range (Wx) in the subject vehicle width direction based on the sequence of reflection points, and
    parking space width calculation means (M7) that calculates a width (Wy) of the parking space (Sp) in subject vehicle length direction based on the sequence of reflection points,
    the parking feasibility determining means (M9) determining the feasibility of parking based on the movable range (Wx) and the width (Wy) of the parking space (Sp), wherein the system further comprises
    processing region setting means (M3) that sets a predetermined processing region (R) formed from a first range in the subject vehicle width direction and a second range in subject vehicle length direction,
    the parking space existence determining means (M6) determining that the parking space (Sp) exists when, among reflection points present within the processing region (R), a distance in the vehicle length direction between a pair of reflection points of the electromagnetic waves with adjacent angles in the horizontal direction is a predetermined value or greater.

2. The vehicular parking feasibility determining system according to claim 1, wherein the system further comprises
boundary line calculation means (M4) that calculates as a vehicle width direction boundary line (Ly) a straight line for which a sum of distances in the vehicle width direction to the reflection points present within the processing region (R) is a minimum, and calculates as a vehicle length direction boundary line (Lx) a straight line for which a sum of distances in subject vehicle length direction therefrom is a minimum,
the movable range calculation means (M8) setting the processing region (R) on left and right with the subject vehicle body axis as a center, and calculating as a movable range (Wx) a minimum distance among the distances in the vehicle width direction of the left and right vehicle width direction boundary lines (Ly).

3. The vehicular parking feasibility determining system according to claim 2, wherein the system further comprises
reflection point storage means (M2) that, when a pair of reflection points is present within the processing region (R), stores as a first reflection point (P1) a reflection point for which, of the pair of reflection points, a distance from the subject vehicle in the vehicle length direction is near, and stores as a second reflection point (P2) a reflection point for which the distance is far,
the boundary line calculation means (M4) calculating, relative to the first reflection point (P1) stored in one of left and right processing regions (R), the vehicle width direction boundary line (Ly) within the other processing region (R) that is more distant in the vehicle length direction.

4. The vehicular parking feasibility determining system according to claim 3, wherein, when a reflection point is present on the subject vehicle body axis side relative to the vehicle width direction boundary line (Ly) within the left and right processing regions (R), the boundary line calculation means (M4) corrects the vehicle width direction boundary line (Ly) so as to pass through said reflection point.

5. The vehicular parking feasibility determining system according to claim 2, wherein, when a reflection point is present on the subject vehicle body axis side relative to the vehicle width direction boundary line (Ly) within the left and right processing regions (R), the boundary line calculation means (M4) corrects the vehicle width direction boundary line (Ly) so as to pass through said reflection point.

6. The vehicular parking feasibility determining system according to claim 2, wherein the system further comprises
reflection point storage means (M2) that, when a pair of reflection points is present within the processing region (R), stores as a first reflection point (P1) a reflection point for which, of the pair of reflection points, a distance from the subject vehicle in the vehicle length direction is near, and stores as a second reflection point (P2) a reflection point for which it is far, and
intersection point calculation means (M5) that calculates an intersection point (P3) of the vehicle width direction boundary line (Ly) on the parking space (Sp) side with the vehicle length direction boundary line (Lx) calculated based on the second reflection point (P2),
the parking space width calculation means (M7) calculating a distance in the vehicle length direction between the first reflection point (P1) and the intersection point (P3) as the width (Wy) of the parking space (Sp).

7. The vehicular parking feasibility determining system according to claim 6, wherein the parking space existence determining means (M6) determines that the parking space (Sp) exists when a distance in the vehicle width direction between the second reflection point (P2) and the intersection point (P3) is a predetermined value or greater.

8. A vehicular parking space detection system comprising:
transceiving means (11) that transmits electromagnetic waves so as to scan a predetermined angular range in the horizontal direction around a subject vehicle at predetermined time intervals, and receives reflected waves of the electromagnetic waves reflected from an object,
reflection point detection means (M1) that detects a reflection point at which electromagnetic waves are reflected from the object based on a result of reception of reflected waves by the transceiving means (11),
parking space existence determining means (M6) that determines the existence of a parking space (Sp) based on pre-stored subject vehicle body dimensional data and a sequence of the reflection points,
processing region setting means (M3) that sets a predetermined processing region (R) formed from a first range in the subject vehicle width direction and a second range in subject vehicle length direction,
the parking space existence determining means (M6) determining that the parking space (Sp) exists when, among reflection points present within the processing region (R), a distance in the vehicle length direction between a pair of reflection points of the electromagnetic waves with adjacent angles in the horizontal direction is a predetermined value or greater.

9. The vehicular parking space detection system according to claim 8, wherein the system further comprises
boundary line calculation means (M4) that calculates as a vehicle width direction boundary line (Ly) a straight line for which a sum of distances in the subject vehicle width direction to the reflection points present within the processing region (R) is a minimum, and calculates as a vehicle length direction boundary line (Lx) a straight line for which a sum of distances in subject vehicle length direction therefrom is a minimum,
reflection point storage means (M2) that, when a pair of reflection points is present within the processing region (R), stores as a first reflection point (P1) a reflection point for which, of the pair of reflection points, a distance from the subject vehicle in the vehicle length direction is near, and stores as a second reflection point (P2) a reflection point for which the distance is far, and
intersection point calculation means (M5) that calculates an intersection point (P3) of the vehicle width direction boundary line (Ly) on the parking space (Sp) side with the vehicle length direction boundary line (Lx) calculated based on the second reflection point (P2),
the parking space existence determining means (M6) determines that the parking space (Sp) exists when a distance in the vehicle width direction between the second reflection point (P2) and the intersection point (P3) is a predetermined value or greater.

10. A vehicular movable range detection system comprising:
transceiving means (11) that transmits electromagnetic waves so as to scan a predetermined angular range in the horizontal direction around a subject vehicle at predetermined time intervals, and receives reflected waves of the electromagnetic waves reflected from an object,
reflection point detection means (M1) that detects a reflection point at which electromagnetic waves are reflected from the object based on a result of reception of reflected waves by the transceiving means (11), movable range calculation means (M8) that calculates a movable range (Wx) in the subject vehicle width direction based on a sequence of reflection points, processing region setting means (M3) that sets a predetermined processing region (R) formed from a first range in the subject vehicle width direction and a second range in subject vehicle length direction, and boundary line calculation means (M4) that calculates as a vehicle width direction boundary line (Ly) a straight line for which a sum of distances in the subject vehicle width direction to the reflection points present within the processing region (R) is a minimum, and calculates as a vehicle length direction boundary line (Lx) a straight line for which a sum of distances in subject vehicle length direction therefrom is a minimum, the movable range calculation means (M8) setting the processing region (R) on left and right with the subject vehicle body axis as a center, and calculating as a movable range (Wx) a minimum distance among the distances in the vehicle width direction of the left and right vehicle width direction boundary lines (Ly).

11. The vehicular movable range detection system according to claim 10, wherein the system further comprises reflection point storage means (M2) that, when a pair of reflection points is present within the processing region (R), stores as a first reflection point (P1) a reflection point for which, of the pair of reflection points, a distance from the subject vehicle in the vehicle length direction is near, and stores as a second reflection point (P2) a reflection point for which the distance is far, the boundary line calculation means (M4) calculating, relative to the first reflection point (P1) stored in one of left and right processing regions (R), the vehicle width direction boundary line (Ly) within the other processing region (R) that is more distant in the vehicle length direction.

12. The vehicular movable range detection system according to claim 11 wherein, when a reflection point is present on the subject vehicle body axis side relative to the vehicle width direction boundary line (Ly) within the left and right processing regions (R), the boundary line calculation means (M4) corrects the vehicle width direction boundary line (Ly) so as to pass through said reflection point.

13. The vehicular movable range detection system according to claim 10 wherein, when a reflection point is present on the subject vehicle body axis side relative to the vehicle width direction boundary line (Ly) within the left and right processing regions (R), the boundary line calculation means (M4) corrects the vehicle width direction boundary line (Ly) so as to pass through said reflection point.

14. A vehicular parking feasibility determining system comprising a transceiver that transmits electromagnetic waves so as to scan a predetermined angular range in the horizontal direction around a subject vehicle at predetermined time intervals, and receives reflected waves of the electromagnetic waves reflected from an object, a reflection point detector that detects a reflection point at which electromagnetic waves are reflected from the object based on a result of reception of reflected waves by the transceiver, a parking space existence determining device that determines the existence of a parking space based on pre-stored subject vehicle body dimensional data and a sequence of the reflection points, a parking feasibility determining device that determines the feasibility of parking the subject vehicle from a current position thereof to the parking space, a movable range calculator that calculates a movable range in the subject vehicle width direction based on the sequence of reflection points, and a parking space width calculator that calculates a width of the parking space in subject vehicle length direction based on the sequence of reflection points, the parking feasibility determining device determining the feasibility of parking based on the movable range and the width of the parking space, wherein the system further comprises a processing region setting device that sets a predetermined processing region formed from a first range in the subject vehicle width direction and a second range in subject vehicle length direction, the parking space existence determining device determining that the parking space exists when, among reflection points present within the processing region, a distance in the vehicle length direction between a pair of reflection points of the electromagnetic waves with adjacent angles in the horizontal direction is a predetermined value or greater.

15. The vehicular parking feasibility determining system according to claim 14, wherein the system further comprises a boundary line calculator that calculates as a vehicle width direction boundary line a straight line for which a sum of the distances in the vehicle width direction to the reflection points present within the processing region is a minimum, and calculates as a vehicle length direction boundary line a straight line for which a sum of the distances in subject vehicle length direction therefrom is a minimum, the movable range calculator setting the processing region on left and right with the subject vehicle body axis as a center, and calculating as a movable range a minimum distance among the distances in the vehicle width direction of the left and right vehicle width direction boundary lines.

16. The vehicular parking feasibility determining system according to claim 15, wherein the system further comprises a reflection point storage device that, when a pair of reflection points is present within the processing region, stores as a first reflection point a reflection point for which, of the pair of reflection points, a distance from the subject vehicle in the vehicle length direction is near, and stores as a second reflection point a reflection point for which the distance is far, the boundary line calculator calculating, relative to the first reflection point stored in one of left and right processing regions, the vehicle width direction boundary line within the other processing region that is more distant in the vehicle length direction.

17. The vehicular parking feasibility determining system according to claim 15, wherein, when a reflection point is present on the subject vehicle body axis side relative to the vehicle width direction boundary line within the left and right processing regions, the boundary line calculator corrects the vehicle width direction boundary line so as to pass through said reflection point.

18. The vehicular parking feasibility determining system according to claim 15, wherein the system further comprises a reflection point storage device that, when a pair of reflection points is present within the processing region, stores as a first reflection point a reflection point for which, of the pair of reflection points, a distance from the subject vehicle in the vehicle length direction is near, and stores as a second reflection point a reflection point for which the distance is far, and an intersection point calculator that calculates an intersection point of the vehicle width direction boundary line on the parking space side with the vehicle length direction boundary line calculated based on the second reflection point, the parking space width calculator calculating a distance in the vehicle length direction between the first reflection point and the intersection point as the width of the parking space.

19. The vehicular parking feasibility determining system according to claim 18, wherein the parking space existence determining device determines that the parking space exists when a distance in the vehicle width direction between the second reflection point and the intersection point is a predetermined value or greater.

20. A vehicular parking space detection system comprising:

a transceiver that transmits electromagnetic waves so as to scan a predetermined angular range in the horizontal direction around a subject vehicle at predetermined time intervals, and receives reflected waves of the electromagnetic waves reflected from an object, a reflection point detector that detects a reflection point at which electromagnetic waves are reflected from the object based on a result of reception of reflected waves by the transceiver, a parking space existence determining device that determines the existence of a parking space based on pre-stored subject vehicle body dimensional data and a sequence of the reflection points, a processing region setting device that sets a predetermined processing region formed from a first range in the subject vehicle width direction and a second range in subject vehicle length direction, the parking space existence determining device determining that the parking space exists when, among reflection points present within the processing region, a distance in the vehicle length direction between a pair of reflection points of the electromagnetic waves with adjacent angles in the horizontal direction is a predetermined value or greater.

21. The vehicular parking space detection system according to claim 20, wherein the system further comprises a boundary line calculator that calculates as a vehicle width direction boundary line a straight line for which a sum of distances in the subject vehicle width direction to the reflection points present within the processing region is a minimum, and calculates as a vehicle length direction boundary line a straight line for which a sum of distances in subject vehicle length direction therefrom is a minimum, a reflection point storage device that, when the pair of reflection points is present within the processing region, stores as a first reflection point a reflection point for which, of the pair of reflection points, a distance from the subject vehicle in the vehicle length direction is near, and stores as a second reflection point a reflection point for which the distance is far, and an intersection point calculator that calculates an intersection point of the vehicle width direction boundary line on the parking space side with the vehicle length direction boundary line calculated based on the second reflection point, the parking space existence determining device determines that the parking space exists when the distance in the vehicle width direction between the second reflection point and the intersection point is a predetermined value or greater.

22. A vehicular movable range detection system comprising:

a transceiver that transmits electromagnetic waves so as to scan a predetermined angular range in the horizontal direction around a subject vehicle at predetermined time intervals, and receives reflected waves of the electromagnetic waves reflected from an object, a reflection point detector that detects a sequence of reflection points at which electromagnetic waves are reflected from the object based on a result of reception of reflected waves by the transceiver, a movable range calculator that calculates a movable range in the subject vehicle width direction based on the sequence of reflection points, a processing region setting device that sets a predetermined processing region formed from a first range in the subject vehicle width direction and a second range in subject vehicle length direction, and a boundary line calculator that calculates as a vehicle width direction boundary line a straight line for which a sum of distances in the subject vehicle width direction to the reflection points present within the processing region is a minimum, and calculates as a vehicle length direction boundary line a straight line for which a sum of distances in subject vehicle length direction therefrom is a minimum, the movable range calculator setting the processing region on left and right with the subject vehicle body axis as a center, and calculating as a movable range a minimum distance among the distances in the vehicle width direction of the left and right vehicle width direction boundary lines.

23. The vehicular movable range detection system according to claim 22, wherein the system further comprises a reflection point storage device that, when a pair of reflection points is present within the processing region, stores as a first reflection point a reflection point for which, of the pair of reflection points, a distance from the subject vehicle in the vehicle length direction is near, and stores as a second reflection point a reflection point for which the distance is far, the boundary line calculator calculating, relative to the first reflection point stored in one of left and right processing regions, the vehicle width direction boundary line within the other processing region that is more distant in the vehicle length direction.

24. The vehicular movable range detection system according to claim 22 wherein, when a reflection point is present on the subject vehicle body axis side relative to the vehicle width direction boundary line within the left and right processing regions, the boundary line calculator corrects the vehicle width direction boundary line so as to pass through said reflection point.

\* \* \* \* \*